United States Patent Office 3,334,282
Patented Aug. 1, 1967

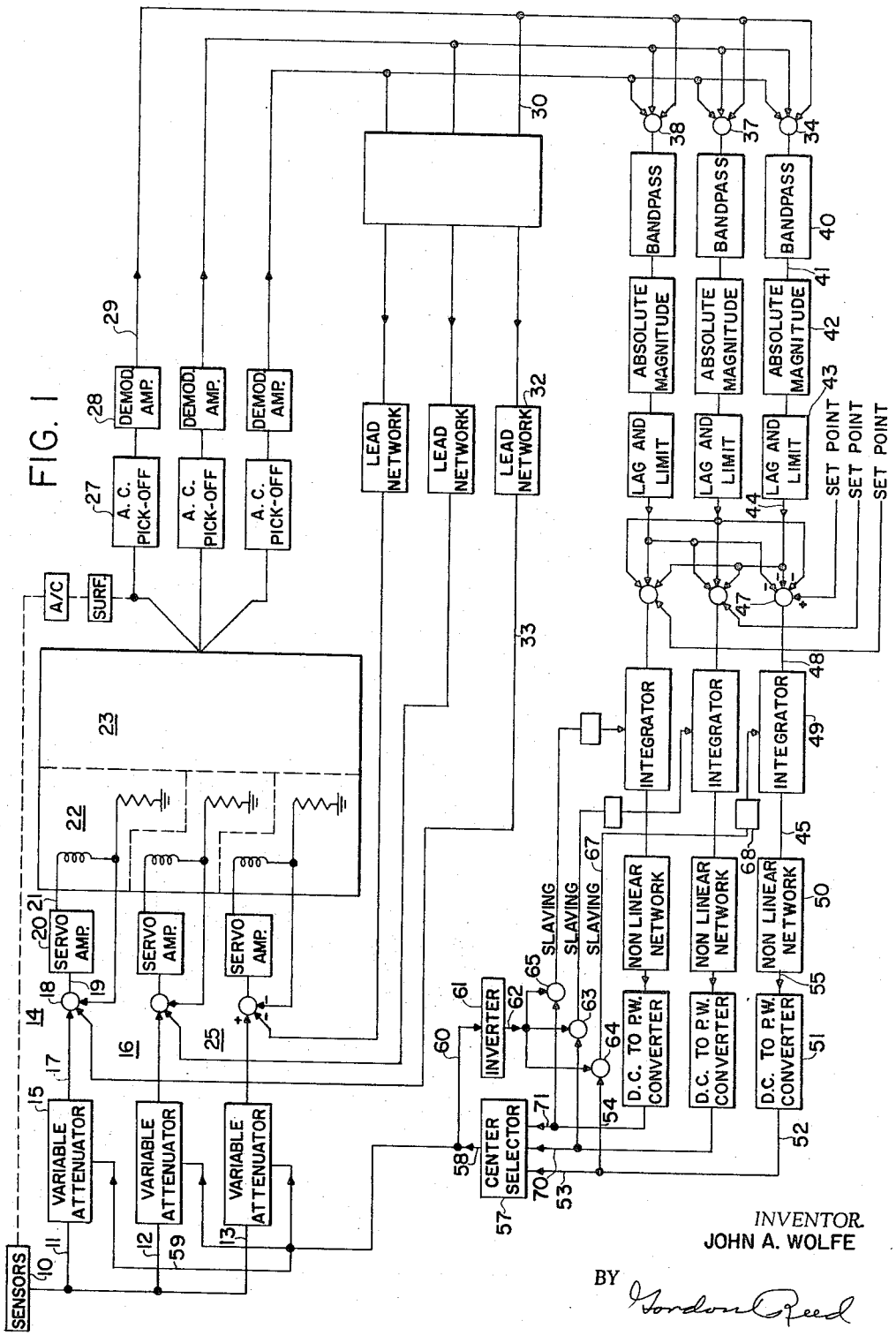

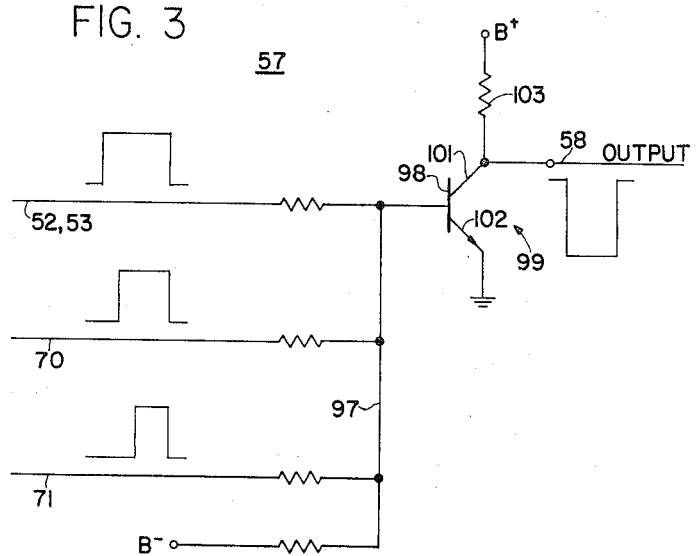
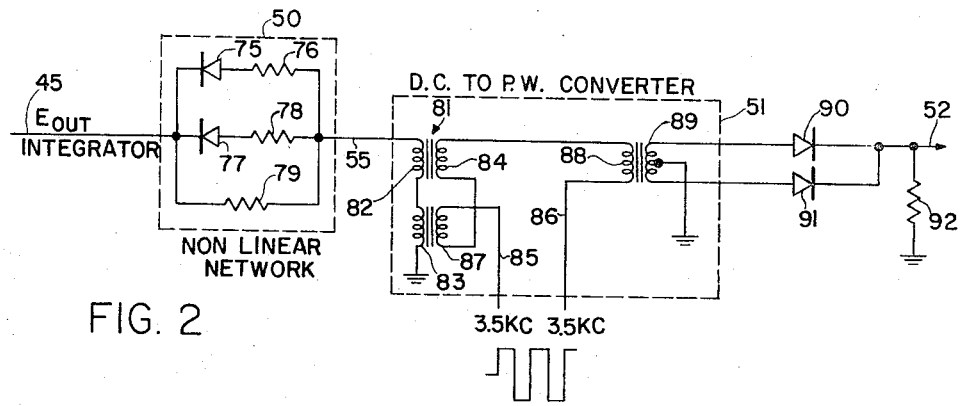

3,334,282
PLURAL CHANNEL CONTROL APPARATUS
John A. Wolfe, St. Paul, Minn., assignor to Honeywell Inc., a corporation of Delaware
Filed Sept. 30, 1963, Ser. No. 312,673
14 Claims. (Cl. 318—18)

The present invention pertains to the area of reliability and particularly that area wherein reliability is enhanced by redundancy.

According to the present invention there is provided a servo system comprising a plurality of subchannels each having an input to which a demand quantity may be applied, and in this case there is a common demand quantity. Each subchannel may comprise an adaptive controller as in the prior U.S. patent to Remus N. Bretoi, 3,057,584 comprising an amplifying stage adapted to produce an output signal dependent on the demand quantity; an actuator controlled by the amplifying stage; a signal providing pickoff operated by the actuator; a bandpass filter receiving the pickoff signal, for passing limit cycle frequencies of the actuator operation; a limit cycle amplitude selector; an integrator jointly controlled by the filter and limit cycle magnitude selector; means controlled by the integrator to vary the gain of the amplifying stage.

An object of the invention is to apply redundancy techniques to a gain changer of an adaptive controller as above in an adaptive condition control servo system operating over a wide range of conditions, such as altitude and air-speed.

A further object of the invention is to provide a comparator of novel type for effecting a "center selection" for control of the gain controller from among a plurality of gain controller inputs.

A further object of the invention is to insure that the center selector also exerts supervisory control over the plurality of gain controller inputs.

Other objects and advantages of the invention will be evident from the following description of an embodiment of the invention taken in connection with the accompanying drawings wherein:

FIGURE 1 is a block diagram of the redundant adaptive control system including redundant gain controllers.

FIGURE 2 is an electrical schematic of the center selector of FIGURE 1; and

FIGURE 3 is an electrical schematic of the nonlinear network and DC to pulse width converter of FIGURE 1.

In an adaptive control system such as the automatic control apparatus for aircraft as in the aforesaid patent to Bretoi No. 3,057,584, a variable gain amplifier controls a servomotor; and the amplifier gain is varied to control the amplitude of the limit cycle of the servomotor. To this end the limit cycle amplitude frequency of the servomotor is passed through a bandpass network or filter, and the output from the filter is thereafter compared with a set point magnitude. The difference from such comparison is an error signal which is used through an integrator to vary the gain of the servoamplifier whereby to obtain the desired limit cycle amplitude of the actuator.

While the invention herein has been embodied in a multichannel control system each having a variable gain amplifying stage, the invention in particular pertains to redundant mechanization of the gain control which may be utilized in connection with a single amplifying stage as well as to a plurality of amplifying stages.

Referring to FIGURE 1, block 10 represents sensors providing various sources of automatic control such as an attitude sensor, an attitude rate sensor, supplying inputs to the summing device 11 in the aforesaid Bretoi patent. The output of such prior art summing device 11 is represented herein as the multiple outputs 11, 12 and 13 of block 10. These outputs comprise input control signals to a plurality of subchannels 14, 16, 25 and each such output is normally in substantial agreement with the others. In view of the fact that the subchannels are similar, only channel 14 will be described in detail. The command signal on transmission means 11 constitutes the input to subchannel 14 of the arrangement. The signal on transmission means 11 is applied directly to an adjustable variable attenuator 15 which may constitute the gain control element in subchannel 14. The output from adjustable gain control attenuator 15 is supplied through transmission means 17 to a summing device 18 having its output in turn supplied over transmission means to servoamplifier 20. The servoamplifier 20 through its output conductor 21 controls the operation for example of a section 22 of a triple redundant fluid type servomotor 23 of the type disclosed in a patent of Robert F. Rasmussen, 3,190,185, filed July 11, 1961, issued June 22, 1965. The servomotor 23 has a common output member operated by power pistons of all three sections thereof, and this output member operates three pickoffs corresponding in number to the number of subchannels.

Pickoff 27 in the subchannel 14 being considered supplies its AC output to a demodulator-amplifier 28 having a limit cycle frequency in its output which in turn through transmission means 29 is connected to a summing device 34. This summing device receives a like input from the two remaining servo operated AC pickoffs. The sum of the three signals which includes a frequency component having an amplitude in accordance with the amplitude of limit cycle operation of the output member of servomotor 23 is supplied to a bandpass network 40 which filters the limit cycle frequency. The limit cycle frequency is supplied over transmission means 41 to an absolute magnitude device 42, such as a full wave rectifier. The DC output from the device 42 is supplied through a lag and limit device 43 to a summing device 47. Summing device 47 sums the outputs of three lag and limit devices with a manually selected set point magnitude signal.

The set point magnitude is the desired amplitude of operation of the servo output member at the limit cycle frequency. In other words the set point determines the limit cycle magnitude. The output from summing device 47 is supplied through transmission means 48 to an integrator 49.

The integrator 49 may be a conventional high gain amplifier with capacitor feedback to provide an integration of the input on transmission means 48. The output from the integrator 49 is supplied through a non-linear network 50, a DC to pulse width converter 51, and transmission means 52, 53 to a "center" selector 57. The significance of the term center will be hereinafter clarified.

The center selector 57 also receives two other inputs from transmission means 70, 71 corresponding with the two other redundant channels in the gain control arrangement of the adaptive controller.

The center selector 57 thereby receives over transmission means 53, 70 and 71 three normally identical inputs which are of "square wave" form. These three inputs all have the same amplitude but they may vary in pulse width when not identical. The center selector is so arranged that it has no output to transmission means 58 until two inputs at least on the input conductors 53, 70, 71 are simultaneously applied. The signals on the transmission means 53, 70 and 71 may vary in width, but all terminate at the same time. Consequently while one pulse width signal may be applied to selector 57 before the other, the center selector 57 will not conduct until the second pulse width signal is applied thereto. The application of a third pulse width signal does not alter the output of the center selector. Thus it is clear that the second signal with respect to pulse width determines the duration of the output of the center selector 57. This in effect means that the duration of output of center selector 57 is determined by the pulse width magnitude of the second signal. Thus in case there is a pulse signal of large width, a second of narrower width, and a third of still narrower width, the output of the center selector is determined by the middle or center signal hence the justification of the term "center" selector. The output on transmission means 58 from the center selector 57 is supplied through transmission means 59 to the variable attenuator 15 to vary the gain of this subchannel. The output is also supplied to like variable attenuators in the other two subchannels. Thus the gain in all of the subchannels is varied to control the magnitude or amplitude of the limit cycle of the output member of the servomotor 23.

While thus far the arrangement provides for adjustment of the gains in the subchannels to control the limit cycle amplitude in accordance with a center or a middle output of the three inputs 53, 70, 71 to the center selector 57, further means are additionally provided, as described hereinafter, to insure that the centering control maintains control of the gains in the subchannels 14, 16, 25 despite a malfunction say in the selected integrator or subsequent elements thereto connected to the particular center pulse width conductor 53, 70, 71. To this end, it will be noted that the output from the center selector 57 on transmission means 58 is also supplied through conductor 60 to a polarity inverter 61. The inverter is provided for phasing purposes, and its output on transmisison means 62 is further supplied to three summing points or summing devices 63, 64, 65. Also these summing devices receive inputs from the outputs of the respective converters such as 51. For example converter 51 supplies an input over transmission means 52, 54 to summing device 64. The output from the summing device 64, for example, of the three summing devices, is supplied through transmission means 67 which includes a deadspot 68 to avoid operating integrator 49 for example for small outputs from summing device 64, and constitutes another input to the integrator 49.

Functionwise, if we assume that transmission means 53 connected to the converter 51 carries a signal with the widest pulse width relative to the signals on transmission means 70, 71, whereby transmission means 53 conducts the widest pulse width input to center selector 57 and further assume that transmission means 70 has the next pulse width and transmission means 71 conducts the lowest or smallest pulse width signal, the output of center selector 57 in duration is in accordance with the pulse width on transmission means 70. It is desired that the three integrators as 49 for example supply similar outputs. Thus the output of integrator 49 should be decreased, that of the integrator connected to transmission means 70 would be unchanged, and that of the integrator connected to transmission means 71 be increased so that all would have about the same output as that supplied to the center pulse width transmission means 70. With the integrators thus having substantially the same outputs, then if there should be a failure thereafter in the integrator connected to transmission means 70, the output of the center selector 57 would not be suddenly changed as might be the case were not such repositioning provided as herein.

For details of the nonlinear network 50 and the DC to PW converter (pulse width converter) reference is made to FIGURE 2. The nonlinear network 50 comprises an impedance network having three electrically parallel channels one comprising a zener diode 75 and resistor 76 in series, a second comprising a diode 77 and resistor 78 in series, and a third comprising the resistor 79 to provide an output current that is a nonlinear function of input voltage on 45. The output from integrator 49 from FIGURE 1 is supplied through transmission means 45 to one side of the impedance network. The output from the network is carried by conductor 55 to the DC to pulse width converter 51 which comprises a reactance device 81 comprising windings 82 and 83 connected in electrical series and to signal ground with one end of winding 81 connected to conductor 55. Windings 81 and 83 are inductively coupled to additional windings 84, 87 reversely connected in series as shown. In series with windings 84, 87 is a winding 88 so that the windings 84, 87, 88 are energized through conductors 85, 86 from a 3.5 kc. square wave supply. Winding 88 in turn is inductively coupled with a further winding 89 having its center tap connected to signal ground and having its ends connected through diodes 90, 91 to a common end of a resistor 92 having its opposite end connected to signal ground. The output from winding 89 appears on conductor 52 and is applied through the further conductor 53 to the center selector in FIGURE 1.

The center selector 57 is shown in detail in FIGURE 3. The outputs from the three DC to pulse width converters are supplied to conductors 52, 53; 70; 71 and through suitable summing resistors to a summing conductor 97. Summing conductor 97 is connected to a base 98 of an NPN type transistor 99 having the collector 101 and emitter 102. The collector is connected through resistor 103 to a B+ supply. The lower end of resistor 103 adjacent the collector supplies the output of the center selector to conductor 58. The emitter 102 is connected to signal ground. The outputs of the three DC to pulse width converters are represented in FIGURE 3 as being carried by the input conductors to the summing conductor 97 of the center selector. It will be noted from FIGURE 3 that the outputs of the DC to PW converters are "square wave" in shape and that they may be of different widths. They are however of the same amplitude, and their outputs extend over various durations of time but all outputs end at the same time. It is evident that the outputs may therefore start at respectively different times from the various widths of the square waves.

As mentioned above, while the amplitudes of the "square waves" are the same, it requires the sum of at least two such amplitudes to initiate conduction of the transistor 99. For the arrangement as illustrated, conduction of transistor 99 will not occur following the application of the square wave on conductor 52, 53 to it until conductor 70 applies its pulse to the summing conductor 97. Thus, the transistor 99 has an output for a period of time dependent upon the width of the intermediate or center pulse and thus in accordance with the output of one of the integrators.

It will now be apparent that I have provided an improved adaptive automatic control system where the improvement particularly enhances the reliability of the system by redundancy techniques applied to the gain controller for the adaptive system. In such an improved gain controller, I have provided redundant channels wherein the actual channel selected for controlling the gain of the system has an output intermediate or between the outputs of other channels and wherein further I provide means for equalizing the outputs of the multiple or redundant channels so that in the event of failure of the selected channel, gain control will still be applied to the adaptive system in accordance with the output of the selected channel just prior to failure therein.

I claim:

1. In condition control apparatus including a variable gain device and a servomotor controlled thereby and in turn positioning an output member, in combination: means providing three signals in accordance with the displacement of the output member; filter means passing desired limit cycle frequencies of said three signals; means converting said three filtered signals of the desired frequency to absolute magnitudes; means providing a selected signal indicative of a desired amplitude of the desired frequency signal; means combining said converted three filtered signals of the desired frequency and the desired or selected magnitude signal; an integrator controlled by the combining means; and means controlled by the integrator controlling the gain of the variable gain device and thereby controlling the servomotor and output member, so that the output member limit cycle magnitude approaches that of the selected magnitude.

2. The apparatus of claim 1, including a number of integrators equal to that of the number of the signals provided in accordance with the displacement of the output member and having substantially the same input; and means controlled by two of said three integrators controlling the gain of said variable gain device.

3. The apparatus of claim 2 wherein the means controlled by the three integrators has a period of operation in accordance with the magnitude of the output of the integrator that is intermediate the magnitudes of the outputs of the two other integrators.

4. In condition control apparatus including a source of electrical command signal a plurality of subchannels each comprising a variable gain device responsive to said electrical signal and a servomotor controlled by the device and in turn positioning an output member and including means providing a number of electrical signals in accordance with the displacement of the output member proportional to the number of subchannels; filter means passing desired limit cycle frequencies of said number of electrical signals representing the limit cycle frequency of said output member; means for converting said number of filtered signals to corresponding absolute value signals; selective means setting up a signal representative of the desired amplitude of the limit cycle; a plurality of summing devices equal to the number of subchannels, combining said absolute value signals and the selected amplitude signal; an integrator controlled by each summing device; a center selector responsive to the multiple integrators and having a duration of operation in accordance with the magnitude of output of that integrator that is intermediate the outputs of the number of integrators; and means modifying the gain in each subchannel in accordance with the output of the center selector.

5. The apparatus of claim 4 and means positioning the remaining integrators in accordance with the output of the center selector.

6. In condition control apparatus including a source of command signal: a plurality of subchannels each including a variable agin device responsive thereto and each controlling individual servo means causing positioning of an output member; means providing signals, in accordance with a function of the operation of or cycling of the output member, the signals totalling in number that of the subchannels; filter means passing the desired function of operation of said output member represented by said signals; means converting said filtered signals to absolute magnitudes; means setting up a selected signal indicative of the desired function of operation of the output member; means combining all of said absolute magnitudes resulting from converting said signals due to operation of said output member with the desired or selected signal; three integrators controlled by the combining means; and means controlled by two of the three integrators controlling the gain of the variable gain device in each subchannel.

7. In condition control apparatus including a source of command signal: a variable gain device responsive thereto and a servomotor controlled by the device and in turn operating an output member; means providing at least three electrical signals in accordance with a function of the operation of the output member; filter means receiving said three signals and passing three electrical signals of a desired frequency related to the function of operation of the output member; means setting up a signal having an amplitude in accordance with the desired function of operation of the output member; means combining said three signals from the filter means and the selected signal; an integrator controlled by said combining means, the number of integrators and combining means equalling three in number; and selector means controlled by the outputs of the three integrators controlling the gain of the variable gain device, the selector means operating for a period in accordance with the magnitude of output of the integrator that is intermediate the outputs of the other two integrators.

8. The apparatus of claim 7 including means controlled by the center selector means modifying the output of other than the intermediate integrator to substantially equalize the outputs of the three integrators.

9. In condition control apparatus including a source of command signal: control apparatus comprising a plurality of subchannels each having a variable gain device and servo means controlled by all of the variable gain devices of the subchannels; means providing multiple signals in accordance with the displacement of the output member, equal to the number of subchannels; filter means passing desired frequencies of said multiple signals; means converting said multiple filtered signals to absolute quantities; means setting up a selected signal defining the amplitude desired of the filtered signals; multiple means combining said multiple signals and the desired signal to provide multiple sums; multiple integrators, an integrator controlled by one of the multiple sums from the combining means; and means controlled by less than all of the integrators varying the gain of the variable gain device in each of the multiple channels.

10. In a multiple channel safety control for a movable craft in combination: three independent signal producing means determining the same signal for control of the craft; one center selector connected to the producing means setting up a desired signal of said three signal representative of the desired control of the craft; three signal comparing means each one connected respectively to one of said signal producing means and to the one center selector; integrating means connected to said comparing means and actuated thereby; and means controlled by the error integrating means modifying the operation of the three signal producing means.

11. In an automatic adaptive control system including a motor and having a system gain changer: means generating a signal in accordance with the limit cycle operation of said motor; three integrators controlled by said signal; and means including a center selector operated by said three integrators for the duration of a period dependent on the magnitude of output of that integrator having neither the largest or smallest output of the output of the three integrators, adjusting the gain changer during said period.

12. The apparatus of claim 11, and further means controlled by the output of the center selector and by the outputs of the three integrators effecting further operation of the two remaining integrators having an output different from that of the intermediate integrator.

13. The apparatus of claim 12, said further means including a deadspot to prevent operation of the integrators until the output to the center selector and the respective output of the integrators differ by a predetermined amount.

14. The apparatus of claim 11, means for providing a signal in accordance with a desired limit cycle magnitude, and means combining said selected signal with the actual limit cycle signal for control of said three integrators.

References Cited

UNITED STATES PATENTS

| 3,054,039 | 9/1962 | Meredith | 318—19 X |
| 3,057,584 | 10/1962 | Bretoi | 318—489 X |
| 3,145,330 | 8/1964 | Hecht | 318—19 |
| 3,156,855 | 11/1964 | Righton et al. | 318—29 X |
| 3,190,586 | 6/1965 | Righton | 318—28 X |

BENJAMIN DOBECK, *Primary Examiner.*

ORIS L. RADER, *Examiner.*